United States Patent
Morrow et al.

(10) Patent No.: US 11,167,720 B2
(45) Date of Patent: Nov. 9, 2021

(54) LOW-PROFILE SEATBELT BUCKLE ASSEMBLY

(71) Applicant: FAURECIA AUTOMOTIVE SEATING, LLC, Auburn Hills, MI (US)

(72) Inventors: Michael Morrow, Royal Oak, MI (US); Emmanuel Pellerin, Oakland Township, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 124 days.

(21) Appl. No.: 16/536,946

(22) Filed: Aug. 9, 2019

(65) Prior Publication Data

US 2021/0039586 A1 Feb. 11, 2021

(51) Int. Cl.
*B60R 22/18* (2006.01)
*B60R 22/26* (2006.01)
*B60R 22/20* (2006.01)

(52) U.S. Cl.
CPC ............. *B60R 22/26* (2013.01); *B60R 22/20* (2013.01); *B60R 2022/1806* (2013.01)

(58) Field of Classification Search
CPC .. B60R 22/26; B60R 22/20; B60R 2022/1806
See application file for complete search history.

(56) References Cited

U.S. PATENT DOCUMENTS

| 5,575,449 | A | * | 11/1996 | Shinbori | B60N 2/0705 |
| | | | | | 248/429 |
| 2005/0067878 | A1 | * | 3/2005 | Borgward | B60R 22/18 |
| | | | | | 297/468 |
| 2007/0222272 | A1 | * | 9/2007 | Taylor | B60R 22/26 |
| | | | | | 297/468 |
| 2016/0021987 | A1 | | 1/2016 | Murase | |
| 2017/0174177 | A1 | * | 6/2017 | Wang | B60R 22/18 |
| 2017/0259777 | A1 | * | 9/2017 | Shimizu | B60R 22/20 |

FOREIGN PATENT DOCUMENTS

| DE | 10204090 | C1 | 6/2003 | | |
| DE | 102005008189 | A1 | * | 8/2006 | ............. B60R 22/26 |

(Continued)

OTHER PUBLICATIONS

Machine translation of DE 102008052332 A1 description only obtained from espacenet.com Feb. 1, 2021.*

(Continued)

*Primary Examiner* — Ruth Ilan
*Assistant Examiner* — Maxwell L Meshaka
(74) *Attorney, Agent, or Firm* — Reising Ethington P.C.

(57) ABSTRACT

A seatbelt buckle assembly is configured for attachment to a vehicle seat frame in a manner that permits a strap of the assembly to pass through narrow openings or gaps of the seat frame before a fastener is used for the attachment. A collar having a flange and a sleeve can be used to retain other buckle assembly components to the strap without the aid of the fastener. The assembly is particularly useful with fold-flat seats where the seatbelt buckle must fold together with the seat back and then be returned to a use position when the seat is unfolded.

16 Claims, 3 Drawing Sheets

(56) References Cited

FOREIGN PATENT DOCUMENTS

DE       102008052332 A1 *   4/2010   ............ B60R 22/18
WO     WO2014171195 A1    10/2014

OTHER PUBLICATIONS

Machine translation of DE 102005008189 A1 description only obtained from espacenet.com Feb. 1, 2021.*
Machine translation of DE 102008052332 A1 obtained from dialogue.proquest.com Feb. 1, 2021.*
Machine translation of DE 102005008189 A1 obtained from dialogue.proquest.com Feb. 1, 2021.*

* cited by examiner

LOW-PROFILE SEATBELT BUCKLE ASSEMBLY

TECHNICAL FIELD

The present disclosure relates generally to vehicle seats and, in particular, to seatbelt buckles and their manner of attachment to vehicle seats.

BACKGROUND

Reconfigurable vehicle passenger cabins require multiple individual components to work and move together. For example, some vehicles are equipped with second or third row seats that can fold, pivot, or otherwise change to a non-seating configuration to increase or alter the shape of available cargo space inside the vehicle when the seats are not being used to carry passengers. But modern vehicle seats include more than just a frame and cushions. Components such as recliner mechanisms, powered positioning adjustment, air ducts, and safety belts are often included or attached to vehicle seats and must be capable of moving with other parts of the seat during folding or other adjustments. One such component is a seatbelt buckle.

U.S. patent application publication 2005/0067878 by Borgward et al. discloses a seatbelt lock with a rotatably mounted lock holder. A flat spiral restoring spring is wound in a single plane between the lock holder and a cover. The spring biases the lock holder into a rest position with one end of the spring against the lock holder and another end of the spring against the cover. The cover is held onto the lock holder by the same bolt that is used to fasten the lock holder to the vehicle structure and uses a push nut on the threaded end of the bolt to hold the bolt, and thereby, the cover in place before the subassembly is installed.

SUMMARY

In accordance with various embodiments, a seatbelt buckle assembly is configured for attachment to a vehicle seat frame via a fastener. The seatbelt buckle assembly includes a buckle, a strap, an aperture, a sleeve, a bracket, and a spring. The buckle is attached to one end of the strap, and the aperture is formed through an opposite end of the strap. The sleeve has a first end at the aperture and extends to an opposite second end. The bracket is attached to the second end of the sleeve. The spring is configured to bias the strap toward a use position when the assembly is attached to the frame. The fastener passes through the sleeve to attach the assembly to the frame, and the spring is retained between the strap and the bracket in the absence of the fastener.

In various embodiments, the seatbelt buckle assembly includes a flange at the first end of the sleeve and on a side of the strap opposite the spring.

In various embodiments, the sleeve and flange are formed together as one piece.

In various embodiments, the seatbelt buckle assembly includes an aperture formed through the bracket along a common axis with the aperture formed through the strap.

In various embodiments, the spring is a torsional spring having a first end configured to be stationary with respect to the frame when the assembly is attached to the frame and a second end that moves with the strap about an axis of the spring to bias the strap toward the use position.

In various embodiments, the spring is configured to bias the strap toward a stop extending from the bracket.

In various embodiments, the spring is a torsional spring that surrounds the sleeve.

In various embodiments, the second end of the sleeve is welded to the bracket.

In various embodiments, the second end of the sleeve is swaged to the bracket.

In various embodiments, the bracket is formed as a separate piece from the strap.

In accordance with various embodiments, a method of attaching a seatbelt buckle assembly to a vehicle seat frame via a fastener includes the steps of: providing a seatbelt buckle assembly comprising a strap, a buckle attached to one end of the strap, and a torsional spring attached to an opposite end of the strap. The torsional spring is attached without the aid of the fastener. The method includes passing the fastener through the strap and through the torsional spring to attach the strap to the frame.

In various embodiments, the method includes the step of passing the strap through a gap formed in the frame such that a portion of the strap between the buckle and the opposite end is in the gap during the step of passing the fastener through the strap and torsional spring.

In various embodiments, the spring in the step of providing the buckle assembly is radially retained to the strap by a sleeve extending along an axis of the spring and is axially retained to the strap by a bracket that is attached to the sleeve.

In various embodiments, a first end of the sleeve extends through the strap to a flange and the bracket is attached to an opposite second end of the sleeve.

In various embodiments, the step of passing the fastener through the strap and torsional spring includes passing the fastener through the bracket to attach the bracket to the frame such that the bracket cannot thereafter rotate about an axis of the spring.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENTS

Described below is a seatbelt buckle assembly configured for attachment to a vehicle seat frame in a manner that permits an end of the assembly to pass through narrow openings or gaps along the seat frame before a fastener is employed for the attachment. The assembly is particularly useful with fold-flat seats where the seatbelt buckle must fold down with the seat back and then return to its original position when the seat is unfolded. Components configured to perform the return function can be pre-assembled as part of the buckle assembly at the fastener location before the fastener is present.

Figure 1:
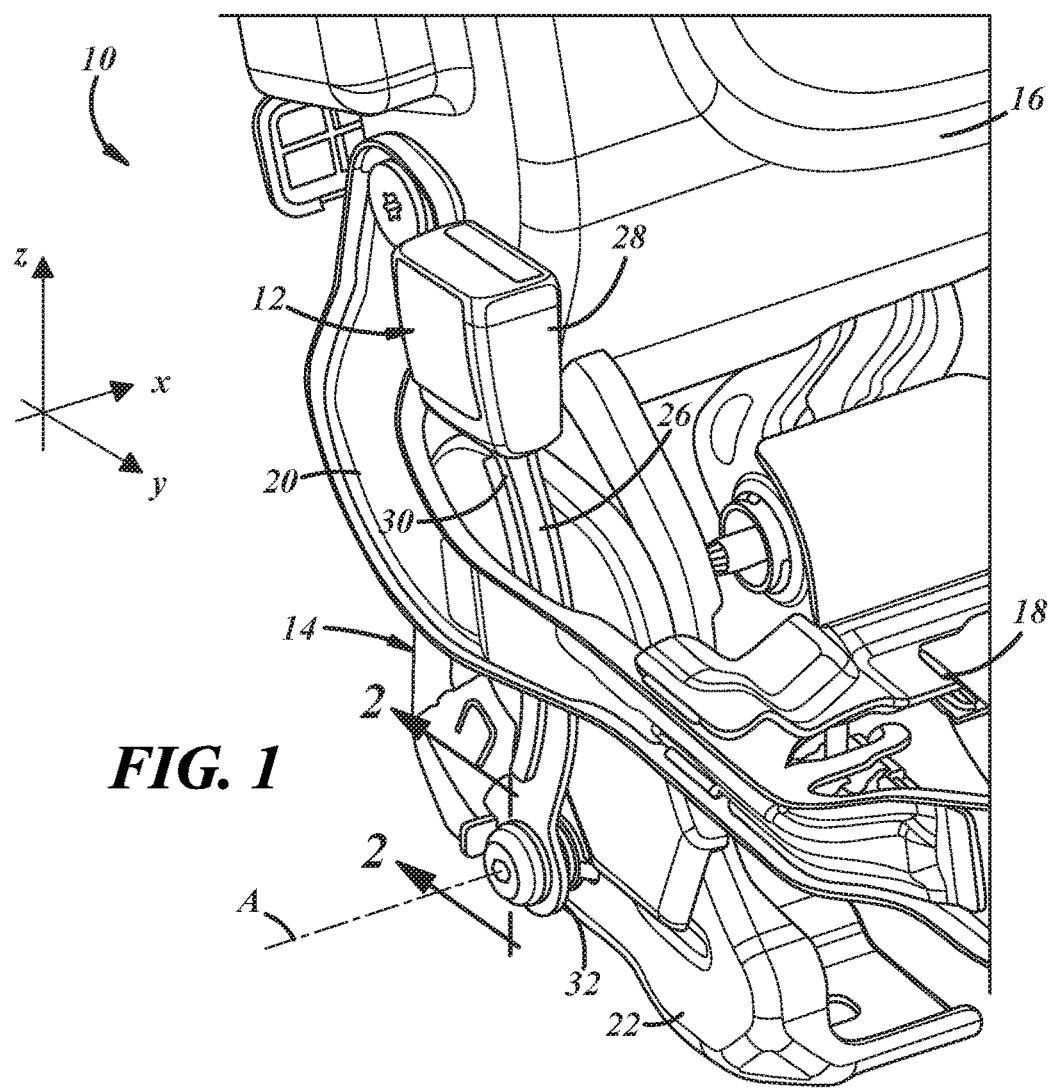
FIG. 1 is a perspective view of a seatbelt buckle assembly attached to a seat frame.

FIG. 1 is a perspective view of a portion of a vehicle seat 10 equipped with a seatbelt buckle assembly 12 attached to a frame 14 of the seat. In the illustrated coordinate system, the x-direction is a transverse direction of the seat (left-to-right for a seated passenger), the y-direction is a longitudinal direction of the seat (front-to-rear for a seated passenger), and the z-direction is a vertical direction of the seat (up-and-down for a seated passenger). In the example of FIG. 1, a lower rear portion of the seat frame is depicted where frame members of a seat back 16 and a seat bottom 18 are pivotably coupled by an L-shaped linkage 20. The frame 14 also includes a base 22 adapted for mounting to a vehicle floor or to another underlying structure.

The linkage 20 may be part of a fold-flat mechanism operable to allow the seat back 16, which is generally upright in a use position of the seat 10 in FIG. 1, to fold forward over the seat bottom 18 such that a rear side of the seat back is completely flat. In such an arrangement, the seat bottom 18 may also move to a more forward and downward position when the seat is moved from the use position to the fold-flat position such that the entire linkage 20 moves forward.

The illustrated seatbelt buckle assembly 12 is configured for attachment to the seat frame 14 via a fastener 24. The assembly 12 includes a strap 26 and a buckle 28 attached to one end 30 of the strap. An opposite end 32 of the strap 26 is attached to the base 22 by the fastener 24 such that the buckle assembly 12 can pivot about an axis A of the fastener and thereby move forward and downward with the seat back 16 when folded down. As discussed further below, the buckle assembly 12 may be biased toward the illustrated upright use position so that the buckle is reliably returned to the use position when the seat 10 is returned to the use position from the fold-flat position.

One problem with spring-loaded buckle structures such as that of Borgward is that they cannot be fitted to seat frames such as that of FIG. 1. In particular, such assemblies require the presence of the fastener used to attach the assembly to the frame in order to hold the spring and other components in place. This means that the attachment end of the assembly cannot fit into or through any gaps or openings that are smaller than the fastener, which is pre-assembled at the attachment end. Specific to FIG. 1, when the assembled seat frame 14 is presented for attachment of the buckle assembly 12, the attachment end 32 of the strap 26 must pass through a gap defined between the linkage 20 and the seat frame base 22. When the distance across such a gap is less that the length of the fastener 24, it is not possible to feed the strap 16 through the gap when the fastener is pre-assembled to the strap. The seatbelt buckle assembly 12 described herein omits the fastener 24 in a manner that preserves the ability to form it as a spring-loaded assembly.

Figure 2:
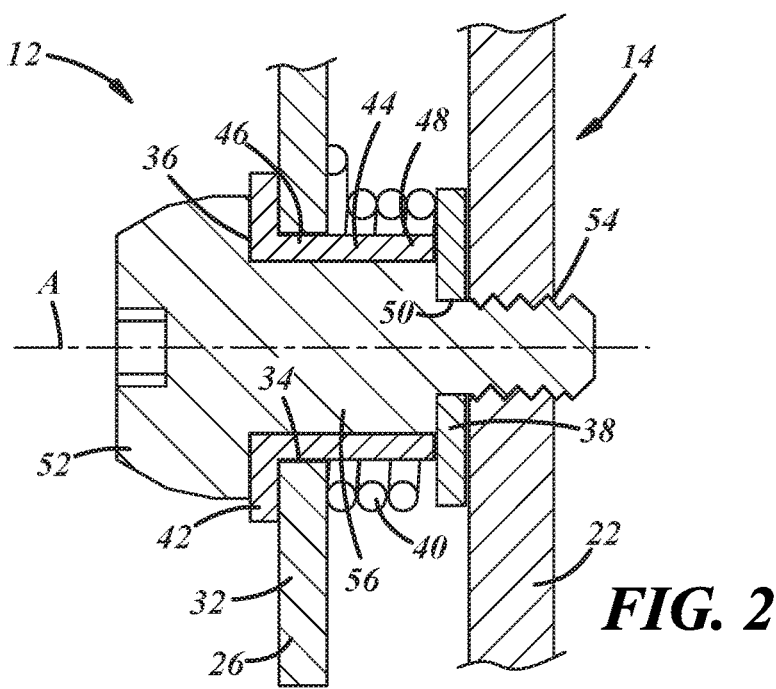
FIG. 2 is a cross-sectional view of a portion of the seatbelt buckle assembly and frame of FIG. 1.

FIG. 2 is a cross-sectional view of the lower end of the buckle assembly 12 after it is attached to the base 22 or other portion of the seat frame 14. In addition to the strap 26 and buckle 28 of FIG. 1, the assembly 12 includes an aperture 34, a collar 36, a bracket 38, and a spring 40. The aperture 34 is formed through the attachment end 32 of the strap 26 along the axis A. The collar 36 includes a flange 42 on one side of the strap 26 and a sleeve 44 that extends from the flange and through the aperture 34 to an opposite side of the strap. The sleeve 44 has a first end 46 at the aperture 34 and extends to an opposite second end 48. The bracket 38 is attached to the second end 48 of the sleeve 44 by a weld, an adhesive, threads, or other suitable means. The illustrated spring 40 is a torsional spring through which the sleeve 44 and fastener 24 extend when attached to the frame 14. The spring 40 is configured to bias the strap 26 toward the use position when the assembly 12 is attached to the frame. For example, one end of the spring 40 may be in a fixed position relative to a portion of the seat frame and the other end of the spring may act on the strap 26.

The fastener 24 passes through the collar 36 and through an aperture 50 in the bracket 38 to attach the assembly 12 to the frame. In the illustrated example, the fastener 24, the strap aperture 34, the collar 36, the spring 40, and the bracket aperture 50 are all coaxial along the axis A when fully assembled. The illustrated fastener 24 is a bolt with a head 52 at one end, a threaded portion 54 at an opposite end, and a shoulder 56 between the head and threaded portion. The head 52 has a diameter larger than an inner diameter of the sleeve 44, the shoulder 56 has a diameter that forms a slip-fit with the inside of the sleeve, and the bracket aperture 50 is sized so that the threaded portion 54 can fit therethrough. The strap aperture 34 is sized to fit about the outer diameter of the sleeve 44 so that the strap 26 can rotate about the axis A. The clamping force of the tightened fastener 24 is present at the interface between the bracket 38 and frame 14 with the underside of the head 52 applying clamp force via the collar 36 and/or the shoulder 56 applying clamp force directly to the bracket 38.

Figure 3:
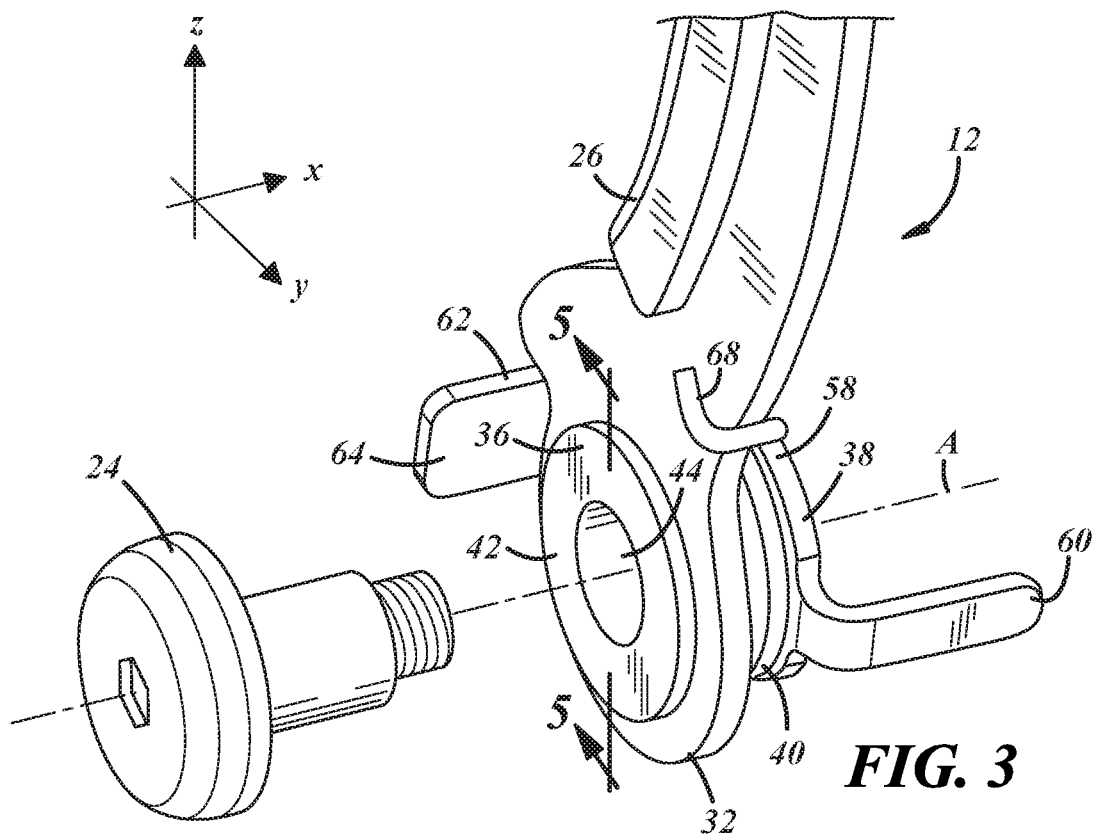
FIG. 3 is a perspective view of an end of the seatbelt buckle assembly of FIGS. 1 and 2.
Figure 4:
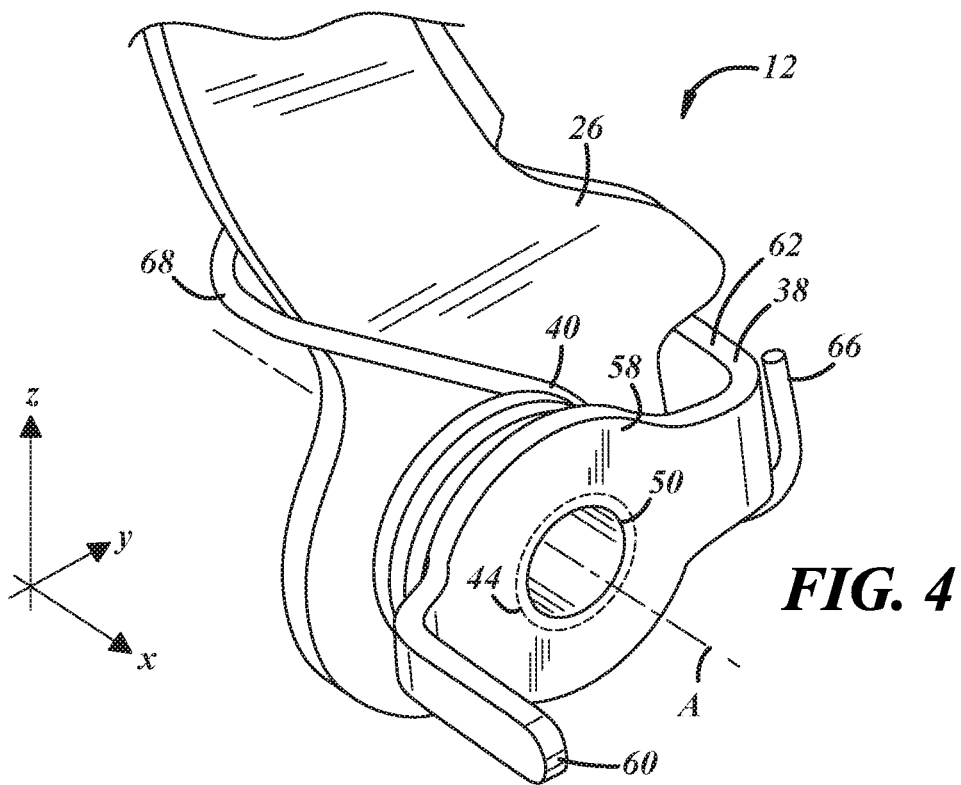
FIG. 4 is a reverse perspective view of the end of the seatbelt buckle assembly of FIG. 3.

The presence of the sleeve 44 of the collar 36 and its attachment to the bracket 38 enables retention of the spring 40 even in the absence of the fastener 24. FIGS. 3 and 4 are perspective views of the fastener side and the opposite frame side of the attachment end 32 of the assembly 12. The outside of the sleeve 44 of the collar 36 is not visible in FIGS. 3 and 4 because the sleeve extends through the center of the spring 40 with its first end 46 fixed to the flange 42 and its second end 48 fixed to the bracket 38. The spring 40 is thus axially constrained between the strap 26 and bracket 38 and radially constrained by the sleeve 44, even in the absence of the fastener 24 and even if the ends of the spring 40 are free. To make the illustrated assembly 12, the collar 36 is inserted in the aperture 34 of the strap 26 with the sleeve 44 passing through the aperture 34 and extending to the opposite side of the strap. The spring 40 is then placed on the sleeve 44, and the bracket 38 is then attached to the opposite end 48 of the sleeve. With the spring 40 sufficiently retained, the attachment end 32 of the strap 26 can now be passed through small gaps such as that between the linkage 20 and base 22 of FIG. 1 with the separately provided fastener 24 then used to attach the assembly 12 to the frame 14.

Variations of the collar 36 and/or sleeve 44 are possible. For instance, the flange 42 could be on the second end 48 of the sleeve 44 with the sleeve passing through the bracket aperture 50 and attached to the spring side of the strap 26. Or a sleeve 44 with no flange could be used and could be permanently or only temporarily attached between the strap 26 and bracket. Retention of the spring 40 is only necessary until the fastener 24 is used to attach the assembly 12 to the frame. In other embodiments the bracket aperture 50 receives the second end 48 of the sleeve 44, and the sleeve can be attached to the bracket at the frame side of the bracket rather than the spring side.

In addition to providing retention of the spring 40, the illustrated bracket 38 provides other features and functions. The second end 48 of the sleeve 44 and the spring rest against a generally flat central portion 58 of the bracket 38. In some embodiments, the bracket 38 may be in the form of a flat washer. The illustrated bracket 38 includes first and second projections 60, 62. The projections 60, 62 are axial projections in this example, but they need only be out of plane with the flat portion 58. The first projection 60 extends in a direction away from the strap 26 and engages with the frame 14 as illustrated in FIG. 1. The first projection 60 thus functions as a locator for the bracket 38 along the frame 14 and as an angular positioner so that the bracket is installed in the proper angular orientation about the axis A when attached. The first projection 60 may also function as an anti-rotation feature so that the bracket remains stationary and does not rotate with increased tension in the spring 40.

The second projection 62 extends in an opposite axial direction toward the strap 26 to a distal end 64 on the fastener side of the strap. The second projection 62 functions as a mechanical stop for the strap 26 against which the strap is biased by the spring 40. When the assembly 12 is attached to the frame, the bracket 38 is stationary with respect to the frame due to clamping forces of the fastener 24 and/or the anti-rotation feature of the first projection 60. The projections 60, 62 then effectively become part of the frame 14 such that the strap 26 is effectively biased against the frame. The second projection 62 or some other part of the bracket 38 can thus be used to fix a first or stationary end 66 of the spring 40 with a second or moving end 68 of the spring engaged with the strap 26. As best illustrated in FIG. 4, the spring 40 is thus not only pre-assembled without the fastener 24, it is also pre-tensioned with the bracket 38 and strap 26 biased together so that the bracket stays in position while the fastener-less strap is fed through the narrow space between the linkage 20 and the base of FIG. 1 or through any other narrow passage of the seat frame 14.

A method of attaching the seatbelt buckle assembly 12 to the seat frame 14 via the fastener 24 may thus include the step of providing the seatbelt buckle assembly including the strap 26, the buckle 28 attached to one end 30 of the strap, and the spring 40 attached to the opposite end 32 of the strap without the aid of the fastener 24. The method may also include the step of passing the separately provided fastener 24 through the strap 26 and through the spring 40 to attach the strap to the frame 14. While particularly useful when the attachment end of the strap 26 is to be passed through narrow spaces of the seat frame, skilled artisans may realize other advantages of having the spring 40 pre-attached to the strap 26 without the fastener. For example, in some cases, even if a pre-assembled fastener can fit through a narrow opening in the frame, there may be a danger of cross-threading the fastener if it cannot be properly aligned with the receiving hole in the frame due to the threaded end of the fastener protruding too far from the back side of the strap.

The method may also include the step of passing the strap 26 through a gap formed in the frame 14 such that a portion of the strap between the buckle 28 and the attachment end 32 of the strap is in the gap while the separately provided fastener 24 is being used to attach the assembly 12 to the frame 14. In other words, the fastener 24 is added only after the strap 26 is in its installation position.

Figure 5:
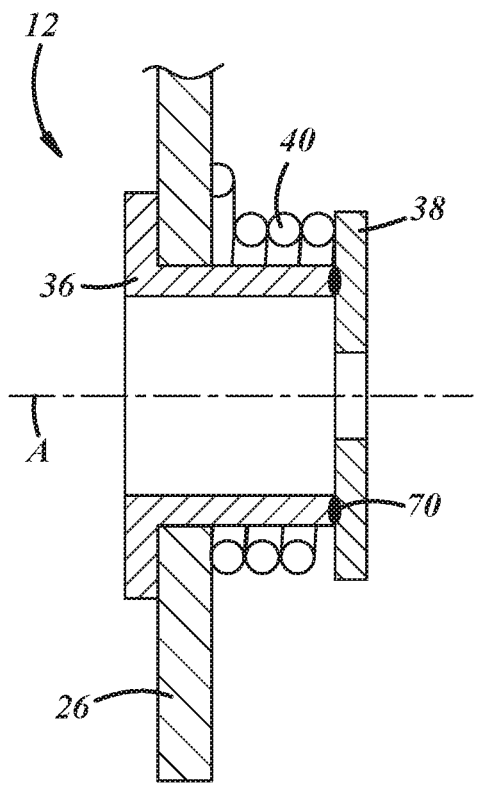
FIG. 5 is a cross-sectional view of the portion of the seatbelt buckle assembly of FIG. 2 before attachment to the frame.

FIG. 5 is a cross-sectional view of the attachment end of the seatbelt buckle assembly 12 of FIGS. 3 and 4. The various above-described features are labeled with the same reference numerals, including the strap 26, the collar 36, the bracket 38, and the spring 40. In this example, the bracket 38 is attached to the collar 36 by an annular weld joint 70, such as a resistance weld joint. The weld joint 70 need not be annular or continuous and can be located along a relatively small portion of the interface between the collar 36 and bracket 38.

Figure 6:
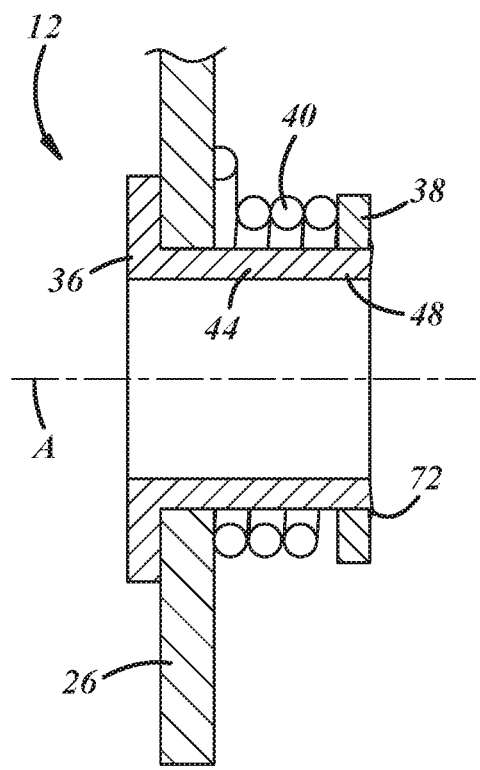
FIG. 6 is a cross-sectional view of a portion of the seatbelt buckle assembly in which a sleeve of the assembly is extended further than in FIG. 5.

FIG. 6 is a cross-sectional view of the attachment end of the seatbelt buckle assembly 12 in which the collar 36 is attached to the bracket by swaging. In particular, the second end 48 of the sleeve 44 of the collar 36 extends through a larger aperture 50 in the bracket 38 and is mechanically deformed to form a swage joint 72. As noted above, other attachment techniques are possible at one or both ends of the sleeve 44.

The illustrated and described embodiments are merely exemplary. For instance, while presented in the context of a fold-flat vehicle seat, the described seatbelt buckle assembly may be used with other types of seats and seat frames. Springs other than torsional springs, such as axial coil springs or cantilevers, could be employed as well, as can other types of threaded or non-threaded fasteners.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A seatbelt buckle assembly configured for attachment to a vehicle seat frame via a fastener, the seatbelt buckle assembly comprising:
   a strap;
   a buckle attached to one end of the strap;
   an aperture formed through an opposite end of the strap;
   a sleeve having a first end at the aperture and extending to an opposite second end;
   a bracket attached to the second end of the sleeve; and
   a spring configured to bias the strap toward a use position when the assembly is attached to the frame,
   wherein the fastener passes through the sleeve and applies a clamping force directly to the bracket to attach the assembly to the frame when the fastener is tightened, and
   wherein the spring is retained between the strap and the bracket in the absence of the fastener.

2. The seatbelt buckle assembly of claim 1, further comprising a flange at the first end of the sleeve and on a side of the strap opposite the spring.

3. The seatbelt buckle assembly of claim 2, wherein the sleeve and flange are formed together as one piece.

4. The seatbelt buckle assembly of claim 1, further comprising an aperture formed through the bracket along a common axis with the aperture formed through the strap.

5. The seatbelt buckle assembly of claim 1, wherein the spring is a torsional spring having a first end configured to be stationary with respect to the frame when the assembly is attached to the frame and a second end that moves with the strap about an axis of the spring to bias the strap toward the use position.

6. The seatbelt buckle assembly of claim 1, wherein the spring is configured to bias the strap toward a stop extending from the bracket.

7. The seatbelt buckle assembly of claim 1, wherein the spring is a torsional spring that surrounds the sleeve.

8. The seatbelt buckle assembly of claim 1, wherein the second end of the sleeve is welded to the bracket.

9. The seatbelt buckle assembly of claim 1, wherein the second end of the sleeve is swaged to the bracket.

10. The seatbelt buckle assembly of claim 1, wherein the bracket is formed as a separate piece from the strap.

11. A method of attaching a seatbelt buckle assembly to a vehicle seat frame via a fastener, the method comprising the steps of:
 (a) providing a seatbelt buckle assembly comprising a strap, a buckle attached to one end of the strap, and a torsional spring attached to an opposite end of the strap without the aid of the fastener; and
 (b) passing the fastener through the strap and through the torsional spring to attach the strap to the frame,
 the method further comprising the step of passing the strap through a gap formed in the frame such that a portion of the strap between the buckle and the opposite end is in the gap during step (b), and
 providing a distance across said gap that is less than a length of the fastener such that the strap cannot be fed through the gap with the fastener passing through the strap and torsional spring.

12. The method of claim 11, wherein the spring in step (a) is radially retained to the strap by a sleeve extending along an axis of the spring and is axially retained to the strap by a bracket that is attached to the sleeve.

13. The method of claim 12, wherein a first end of the sleeve in step (a) extends through the strap to a flange and the bracket is attached to an opposite second end of the sleeve.

14. The method of claim 12, wherein step (b) includes passing the fastener through the bracket to attach the bracket to the frame such that the bracket cannot rotate about said axis after step (b).

15. The seatbelt buckle assembly of claim 1, wherein a head of the fastener applies the clamping force via a collar including the sleeve so that the bracket is clamped between the sleeve and the frame when the fastener is tightened.

16. The seatbelt buckle assembly of claim 1, wherein a shoulder of the fastener applies the clamping force to the bracket so that the bracket is clamped between the shoulder and the frame when the fastener is tightened.

* * * * *